US011689071B2

(12) United States Patent
Hu et al.

(10) Patent No.: US 11,689,071 B2
(45) Date of Patent: Jun. 27, 2023

(54) ROTOR STRUCTURE, PERMANENT MAGNET AUXILIARY SYNCHRONOUS RELUCTANCE MOTOR, AND ELECTRIC VEHICLE

(71) Applicant: GREE ELECTRIC APPLIANCES, INC. OF ZHUHAI, Guangdong (CN)

(72) Inventors: Yusheng Hu, Zhuhai (CN); Tong Tong, Zhuhai (CN); Suhua Lu, Zhuhai (CN); Yong Xiao, Zhuhai (CN); Bin Chen, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 150 days.

(21) Appl. No.: 16/975,083

(22) PCT Filed: Dec. 7, 2018

(86) PCT No.: PCT/CN2018/119793
§ 371 (c)(1),
(2) Date: Aug. 21, 2020

(87) PCT Pub. No.: WO2019/174317
PCT Pub. Date: Sep. 19, 2019

(65) Prior Publication Data
US 2021/0091615 A1    Mar. 25, 2021

(30) Foreign Application Priority Data
Mar. 16, 2018 (CN) .......................... 201810218942.5

(51) Int. Cl.
*H02K 1/27*     (2022.01)
*B60K 1/00*     (2006.01)
*H02K 1/276*    (2022.01)

(52) U.S. Cl.
CPC ............... *H02K 1/276* (2013.01); *B60K 1/00* (2013.01); *H02K 2213/03* (2013.01)

(58) Field of Classification Search
CPC .. H02K 1/2766; H02K 1/276; H02K 2213/03; H02K 21/14; B60K 1/00; Y02T 10/64
(Continued)

(56) References Cited

U.S. PATENT DOCUMENTS 6,008,559 A * 12/1999 Asano .................... H02K 1/276
                                                              310/216.073
8,102,091 B2 * 1/2012 Ionel .................... H02K 1/2766
                                                              310/156.53
(Continued)

FOREIGN PATENT DOCUMENTS

CN      101728910 A      6/2010
CN      102790502 A      11/2012
(Continued)

OTHER PUBLICATIONS

International Search Report for PCT Application No. CN2018/119793 dated Feb. 28, 2019, 3 pages.
(Continued)

*Primary Examiner* — Alex W Mok
(74) *Attorney, Agent, or Firm* — J. Miguel Hernandez; James R. Gourley; Carstens, Allen & Gourley, LLP

(57) ABSTRACT

A rotor structure, a permanent magnet auxiliary synchronous reluctance motor and an electric vehicle. The rotor structure includes a rotor body. The rotor body is provided with an outer magnetic steel slot; an inner magnetic steel slot; a first bent slot, a first end of the first bent slot being in communication with the outer magnetic steel slot, and a second end of the first bent slot extending towards an outer edge of the rotor body and spreading gradually away from a direct axis of the rotor body; and a third bent slot, a first end of the third (Continued)

bent slot being in communication with the inner magnetic steel slot and being arranged to be adjacent to the first bent slot, and a second end of the third bent slot extending towards the outer edge of the rotor body and spreading gradually away from a straight axis.

17 Claims, 4 Drawing Sheets

(58) Field of Classification Search
USPC .................................................. 310/156.56
See application file for complete search history.

(56) References Cited

U.S. PATENT DOCUMENTS

| | | | |
|---|---|---|---|
| 8,546,990 B2 * | 10/2013 | Suzuki | H02K 1/2766 310/156.53 |
| 8,760,026 B2 * | 6/2014 | Suzuki | H02K 1/2766 310/156.53 |
| 9,461,510 B2 * | 10/2016 | Lillington | H02K 1/2746 |
| 2011/0273047 A1 | 11/2011 | Palfai et al. | |
| 2013/0106226 A1 | 5/2013 | Aoyama | |
| 2013/0106228 A1 | 5/2013 | Aoyama | |
| 2017/0187257 A1 | 6/2017 | Liu et al. | |

FOREIGN PATENT DOCUMENTS

| | | | |
|---|---|---|---|
| CN | 203674941 U | | 6/2014 |
| CN | 104038011 A | | 9/2014 |
| CN | 204205765 U | | 3/2015 |
| CN | 105846558 A | | 8/2016 |
| CN | 105958690 A | | 9/2016 |
| CN | 205566051 U | | 9/2016 |
| CN | 106329773 A | | 1/2017 |
| CN | 106410999 A | | 2/2017 |
| CN | 107659101 A | | 2/2018 |
| CN | 108321953 A | | 7/2018 |
| CN | 108336842 A | | 7/2018 |
| EP | 1089417 A2 | | 4/2001 |
| JP | 10051984 A | * | 2/1998 |
| JP | 3605475 B2 | | 12/2004 |
| JP | 2006314152 A | | 11/2006 |
| JP | 2008518580 A | | 5/2008 |
| KR | 1020130092887 A | | 8/2013 |
| KR | 1020170050079 A | | 5/2017 |
| WO | 2006/047519 A2 | | 5/2006 |

OTHER PUBLICATIONS

European Extended Search Report for PCT Application No. CN2018119793 dated Mar. 21, 2016, 15 pages.
English machine translation of CN205566051U published on Sep. 7, 2016 (7 pages).
Office Action for Japanese Patent Application No. 2020-544759 dated Sep. 21, 2021 (5 pages).
Office Action for Korean Patent Application No. 10-2020-7024897 dated May 21, 2022 (7 pages).

* cited by examiner

ROTOR STRUCTURE, PERMANENT MAGNET AUXILIARY SYNCHRONOUS RELUCTANCE MOTOR, AND ELECTRIC VEHICLE

CROSS REFERENCE TO RELATED APPLICATION

This application claims all benefits accruing under 35 U.S.C. § 119 from China Patent Application No. 201810218942.5, filed on Mar. 16, 2018 in the China National Intellectual Property Administration, the entire content of which is hereby incorporated by reference. This application is a national phase under 35 U.S.C. § 120 of international patent application PCT/CN2018/119793, entitled "ROTOR STRUCTURE, PERMANENT MAGNET AUXILIARY SYNCHRONOUS RELUCTANCE MOTOR, AND ELECTRIC VEHICLE" filed on Dec. 7, 2018, the content of which is also hereby incorporated by reference.

TECHNICAL FIELD

The present application relates to the technical field of motor equipment, and particularly to a rotor structure, a permanent magnet auxiliary synchronous reluctance motor, and an electric vehicle.

BACKGROUND

At present, new energy vehicles generally adopt rare earth permanent magnet motors. A rare earth permanent magnet motor has a higher power factor, and the volume of a corresponding controller can be smaller. However, it has the disadvantages of consuming a large amount of rare earth resources and higher cost. Therefore, the permanent magnet reluctance motor adopting ferrite as the permanent magnet material is gradually becoming a hot research spot. At present, in practice the permanent magnet reluctance motors are mostly applied in small products such as home appliances in the industry, and have the characteristic that the torque density is moderate, or not high, and that saturation of a magnetic circuit is not serious. However, when the permanent magnet reluctance motor is applied in a new energy vehicle, it is required to have a more compact structure, and in term of design, have a torque density twice more than that of a common permanent magnet motor. Therefore, saturation is also quite serious, thus causing the problem that the power factor is tremendously reduced, and especially in the application of permanent magnet reluctance motors, causing the reduction of efficiency of the motor.

In the prior art, a higher salient-pole ratio is obtained by adopting a suitable ratio of inner to outer diameters, thereby improving the efficiency of the motor. The increase of the salient-pole ratio has a certain effect on the improvement of a power factor. However, in the case of the saturation of the magnetic circuit, the q-axis inductance drops rapidly, thus the initially designed high salient-pole ratio also drops rapidly, and the initial design becomes invalid in the case of the high saturation of the magnetic circuit.

In the prior art, a ratio of a bottom diameter of a magnetic steel to an outer diameter of a rotor is also set to limit a volume percentage of the magnetic steel in the rotor, thereby ensuring a maximum utilization of the reluctance torque. However, in a practical research, it was found that it is not always better as the bottom of the rotor is closer to the rotation shaft hole. Since the closer the bottom of the rotor is to the axis, the longer the magnetic circuit. When the magnetic circuit is highly saturated, the inductance will attenuate more rapidly, which is prejudicial to the improvement of the power factor.

SUMMARY OF THE INVENTION

The main objective of the present application is to provide a rotor structure, a permanent magnet auxiliary synchronous reluctance motor, and an electric vehicle, to solve the problem of low efficiency of the motor in the art.

In order to achieve the above objective, according to an aspect of the present application, a rotor structure is provided. The rotor structure includes a rotor body provided with magnetic steel slot groups, the magnetic steel slot groups each includes: an outer layer magnetic steel slot; an inner layer magnetic steel slot, wherein the outer layer magnetic steel slot and the inner layer magnetic steel slot are arranged to be adjacent to each other, and a magnetic conduction path is formed between the outer layer magnetic steel slot and the inner layer magnetic steel slot; a first bent slot, wherein a first end of the first bent slot is in communication with the outer layer magnetic steel slot, and a second end of the first bent slot extends towards an outer edge of the rotor body and spreads gradually away from a direct axis; a third bent slot, wherein a first end of the third bent slot is in communication with the inner layer magnetic steel slot; the third bent slot is arranged to be adjacent to the first bent slot; and a second end of the third bent slot extends towards the outer edge of the rotor body and spreads gradually away from the direct axis.

Further, Wr1 denotes a minimum distance between the second end of the first bent slot and the second end of the third bent slot, and Wr2 denotes a minimum distance between the first end of the third bent slot and a side wall of the first bent slot, wherein Wr2/Wr1>0.8.

Further the outer layer magnetic steel slot includes: a first outer layer magnetic steel slot segment, a first end of the first outer layer magnetic steel slot segment extends towards a rotation shaft hole of the rotor body; a second end of the first outer layer magnetic steel slot segment extends towards the outer edge of the rotor body and spreads gradually away from the direct axis; the first bent slot is in communication with the second end of the first outer layer magnetic steel slot segment; and a first flux barrier is formed between the second end of the first bent slot and the outer edge of the rotor body; and a second outer layer magnetic steel slot segment, wherein, a first end of the second outer layer magnetic steel slot segment extends towards the rotation shaft hole; a second end of the second outer layer magnetic steel slot segment extends towards the outer edge of the rotor body and spreads gradually away from the direct axis; the first outer layer magnetic steel slot segment and the second outer layer magnetic steel slot segment are arranged symmetrically relative to the direct axis; and a second flux barrier is formed between the second end of the third bent slot and the outer edge of the rotor body.

Further, the magnetic steel slot groups each further includes a second bent slot, a first end of the second bent slot is in communication with the second end of the second outer layer magnetic steel slot segment; the second end of the second bent slot extends towards the outer edge of the rotor body and spreads gradually away from the direct axis; an angle is formed by a length directional geometric center line of the first bent slot, and a length directional geometric center line of the second bent; and the first bent slot and the second bent slot are arranged symmetrically relative to the direct axis.

Further, A1 denotes a central angle corresponding to an arc of a connection line between a point, at which an extension line of a side wall of the first bent slot proximate to the direct axis and the outer edge of the rotor body intersect, and a point, at which an extension line of a side wall second bent slot proximate to the direct axis and the outer edge of the rotor body intersect, and $A1 > 0.63 \times 360°/p$, wherein p denotes a number of poles.

Further, A3 denotes a central angle corresponding to an arc of the first flux barrier, and A2 denotes a central angle corresponding to an arc of the second flux barrier, wherein $0.18 \times 360°/p > A2 + A3 > 0.13 \times 360°/p$, and p denotes a number of poles.

Further, the inner layer magnetic steel slot comprises a first inner layer magnetic steel slot segment, a second inner layer magnetic steel slot segment, and a third inner layer magnetic steel slot segment, which are arranged sequentially; the first inner layer magnetic steel slot segment, the second inner layer magnetic steel slot segment, and the third inner layer magnetic steel slot segment are in communication with one another sequentially to form a U-shaped structure having an opening towards the outer edge of the rotor body.

Further, the rotor structure further comprises an inner layer magnetic steel, and the inner layer magnetic steel includes: a first magnetic steel disposed in the first inner layer magnetic steel slot segment; a second magnetic steel disposed in the second inner layer magnetic steel slot segment; and a third magnetic steel disposed in the third inner layer magnetic steel slot segment, L1 is a length of the first magnetic steel and/or a length of the third magnetic steel, and L2 is a length of a connection line of two side walls of two ends of the second magnetic steel towards the outer edge of the rotor body, wherein $L2/L1 > 0.7$.

Further, the first magnetic steel, the second magnetic steel, and the third magnetic steel are spaced apart from one another; the second magnetic steel is a plate-shaped magnetic steel; or the first magnetic steel, the second magnetic steel, and the third magnetic steel are provided as an integral whole, and the second magnetic steel is a U-shaped magnetic steel.

According to another aspect of the present application, a permanent magnet auxiliary synchronous reluctance motor is provided, and the permanent magnet auxiliary synchronous reluctance motor includes any one of the rotor structures above.

Further, the permanent magnet auxiliary synchronous reluctance motor includes a stator, an inner circumferential surface of the stator is provided with stator teeth; the rotor body is disposed inside the stator and is rotatable relative to the stator; an inner diameter of the stator is Di1; an outer diameter of the rotor body is Di2, wherein $0.6 < Di2/Di1 < 0.8$.

Further, closed magnetic induction lines are formed between the rotor body and the stator; S1 denotes a length of a magnetic induction line formed in the stator, and S2 denotes a length of a magnetic induction line formed in the magnetic conduction path of the rotor body, wherein $1.1 S1 < S2 < 1.35 1$.

According to another aspect of the present application, an electric vehicle is provided, and the electric vehicle includes any one of the rotor structures above.

By applying the technical solutions of the present application, the first bent slot and the third bent slot are respectively arranged to be in communication with the outer layer magnetic steel slot and the inner layer magnetic steel slot, and the first bent slot and the third bent slot are arranged to extend outwards in a radial direction of the rotor body and spread gradually away from the direct axis of the magnetic steel slot group. Such an arrangement effectively increases the distance of the magnetic conduction path between the first bent slot and the third bent slot, thereby improving the performance of the rotor body and the efficiency of the motor having the rotor structure.

BRIEF DESCRIPTION OF THE DRAWINGS

The accompanying drawings, which constitute a part of this application, are used to provide further understanding of the present application. The illustrative embodiments of the present application and the descriptions thereof are used to interpret the present application, but not intended to constitute any improper limitation on the present application. In the drawings.

DETAILED DESCRIPTION OF THE EMBODIMENTS

Figure 1:
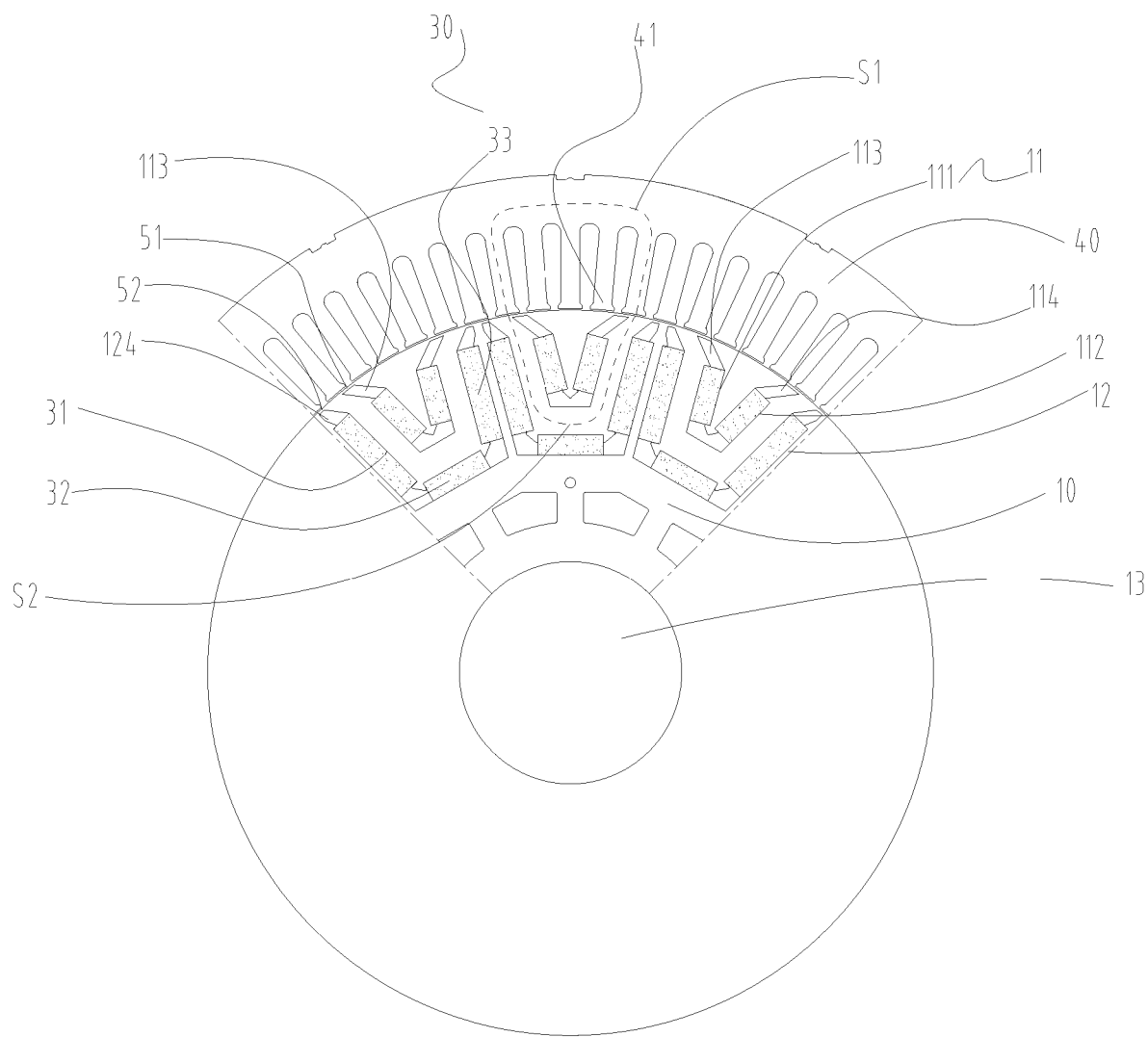
FIG. 1 is a schematic structure diagram illustrating a rotor structure according to a first embodiment of the present application.

It should be noted that, under the premise of no conflict, the embodiments in the present application and the features included in the embodiments can be combined with each other. The present application will be described in detail below with reference to the drawings combining with the embodiments.

It should be noted that, the terminology herein is used for describing the specific embodiments, but not intended to limit the illustrative embodiments of the present application. The singular terms herein are intended to include their plural unless specific descriptions are provided in context. Additionally, it should be also understood that, the terms "include" and/or "comprise" in the description refer to including the features, steps, operations, devices, components, and/or combinations thereof.

It should be specified that the terms "first", "second", etc. in the description, the claims and the drawings in the present application are just used to distinguish similar objects, but not used to describe a specific order or an order of priority. It should be understood that such terms may be interchangeable under appropriate conditions, such that the embodiments of the present application illustrated in the drawing or described herein can be implemented, for example, in a sequence other than the sequences illustrated or described herein. In addition, the terms "comprise", "have" and any variations thereof are intended to cover a non-exclusive inclusion. For example, a process, a method, a system, a product, or a device that includes a series of steps or units is not limited to those steps or units listed clearly, but may include other steps or units, which are not clearly listed, or which are inherent to such a process, a method, a product or a device.

For the convenience of description, terms of spatial relations such as "above", "over", "on a top surface", "upper", etc., may be used herein to describe the spatial position relationships of a device or a feature with other devices or features shown in the drawings. It should be understood that the terms of spatial relations are intended to include other different orientations in use or operation in addition to the orientation of the device described in the drawings. For example, if the device in the drawings is placed upside down, the device described as "above other devices or structures" or "over other devices or structures" will be positioned as "below other devices or structures" or "under other devices or structures". Thus, the exemplary term "above" may include both "above" and "below". The device can also be positioned in other different ways (rotating 90 degrees or at other orientations), and the corresponding explanations for the description of the spatial relations will be provided herein.

The exemplary embodiments according to the present application will be described in more detail in reference to the drawings herein. However, these exemplary embodiments can be implemented in various manners, and they should not be construed as limitation to the embodiments illustrated herein only. It should be understood that the provision of these embodiments is to make the disclosure of the present application more sufficient and thorough, and to sufficiently convey the concept of the exemplary embodiments to those skilled in the art. For the clarity, thicknesses of layers and regions may be increased, and the same devices are denoted by the same reference sign, thereby omitting the description thereof.

Referring to FIGS. 1 to 4, a rotor structure is provided according to embodiments of the present application.

As shown in FIG. 1, the rotor structure includes a rotor body 10. The rotor body 10 is provided with magnetic steel slot groups. The magnetic steel slot groups each include an outer layer magnetic steel slot 11, an inner layer magnetic steel slot 12, a first bent slot 113, and a third bent slot 124. The outer layer magnetic steel slot 11 and the inner layer magnetic steel slot 12 are arranged to be adjacent to each other. A magnetic conduction path is formed between the outer layer magnetic steel slot 11 and the inner layer magnetic steel slot 12. A first end of the first bent slot 113 is in communication with the outer layer magnetic steel slot 11. A second end of the first bent slot 113 extends towards an outer edge of the rotor body 10 and spreads gradually away from a direct axis, that is, the d-axis (shown in FIG. 4), of the rotor body 10. A first end of the third bent slot 124 is in communication with the inner layer magnetic steel slot 12 and is adjacent to the first bent slot 113. A second end of the third bent slot 124 extends towards the outer edge of the rotor body 10 and spreads gradually away from the direct axis.

In this embodiment, the outer layer magnetic steel slot and the inner layer magnetic steel slot are respectively provided with the first bent slot and the third bent slot, which are respectively in communication with the outer layer magnetic steel slot and the inner layer magnetic steel slot, and the first bent slot and the third bent slot are arranged to extend outwards in a radial direction of the rotor body and spread gradually away from the direct axis of the magnetic steel slot group. Such an arrangement effectively increases the distance of the magnetic conduction path between the first bent slot and the third bent slot, thereby improving the performance of the rotor body and the efficiency of a permanent magnet auxiliary synchronous reluctance motor (hereinafter referred as to motor) having the rotor structure.

Specifically, Wr1 denotes a minimum distance between the second end of the first bent slot 113 and the second end of the third bent slot 124, and Wr2 denotes a minimum distance between the first end of the third bent slot 124 and a side wall of the first bent slot 113, where Wr2/Wr1>0.8. Such an arrangement can effectively mitigate the saturation at an inlet of the magnetic conduction path.

The outer layer magnetic steel slot 11 includes a first outer layer magnetic steel slot segment 111 and a second outer layer magnetic steel slot segment 112. A first end of the first outer layer magnetic steel slot segment 111 extends towards a rotation shaft hole 13 of the rotor body 10. A second end of the first outer layer magnetic steel slot segment 111 extends towards the outer edge of the rotor body 10 and spreads gradually away from the direct axis. The first bent slot 113 is in communication with the second end of the first outer layer magnetic steel slot segment 111. A first flux barrier 51 is formed between the second end of the first bent slot 113 and the outer edge of the rotor body 10. A first end of the second outer layer magnetic steel slot segment 112 extends towards the rotation shaft hole 13. A second end of the second outer layer magnetic steel slot segment 112 extends towards the outer edge of the rotor body 10 and spreads gradually away from the direct axis. The first outer magnetic steel slot segment 111 and the second outer magnetic steel slot segment 112 are arranged symmetrically relative to the direct axis. A second flux barrier 52 is formed between the second end of the third bent slot 124 and the outer edge of the rotor body 10.

The magnetic steel slot group further includes a second bent slot 114. A first end of the second bent slot 114 is in communication with the second end of the second outer layer magnetic steel slot segment 112. The second end of the second bent slot 114 extends towards the outer edge of the rotor body 10 and spreads gradually away from the direct axis. An angle is formed by a length directional geometric center line of the first bent slot 113 and an extension line of a length directional geometric center line of the second bent slot 114. The first bent slot 113 and the second bent slot 114 are arranged symmetrically relative to the direct axis. Such an arrangement can effectively improve the magnetic conduction performance of the rotor structure.

Figure 3:
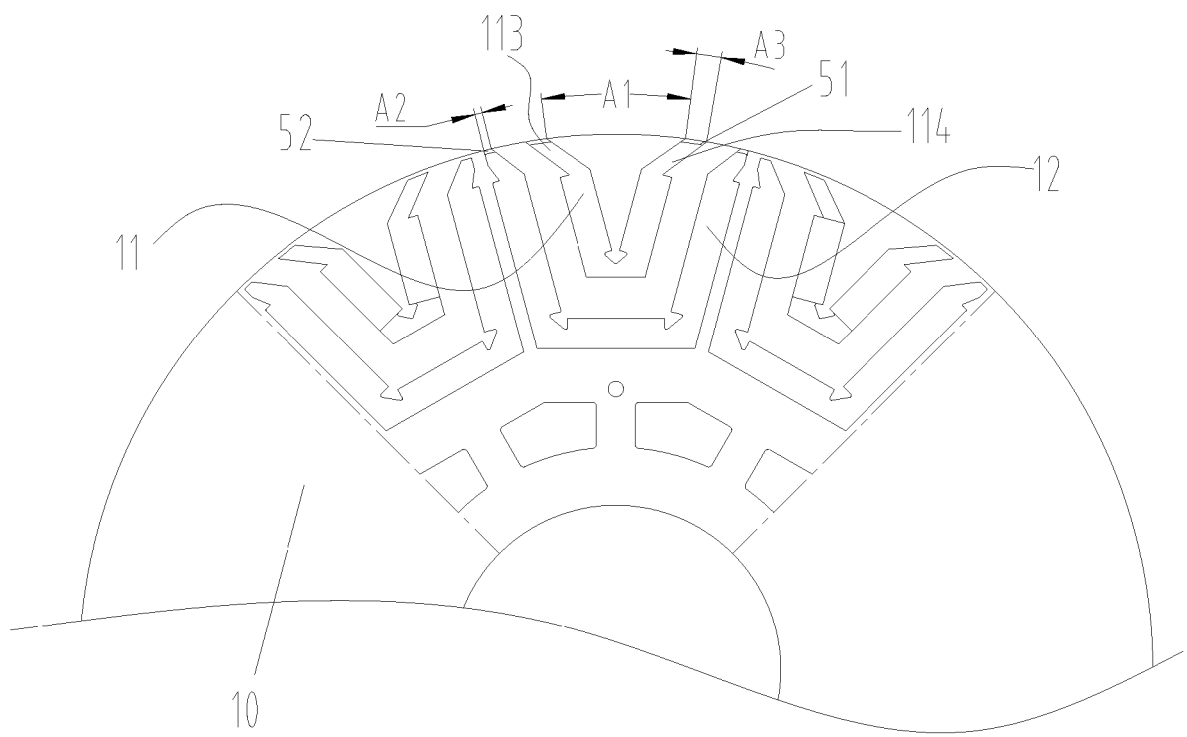
FIG. 3 is a schematic structure diagram illustrating a rotor structure according to a third embodiment of the present application.

As shown in FIG. 3, A1 denotes a central angle corresponding to an arc of a connection line between a point, at which an extension line of a side wall of the first bent slot 113 proximate to the direct axis and the outer edge of the rotor body 10 intersect, and a point, at which an extension line of a side wall of the second bent slot 114 proximate to the direct axis and the outer edge of the rotor body 10 intersect, and A1>0.63×360°/p, where p denotes a number of poles. A3 denotes a central angle corresponding to an arc of the first flux barrier 51, and A2 denotes a central angle corresponding to an arc of the second flux barrier 52, where 0.18×360°/p>A2+A3>0.13×360°/p, and p denotes the number of poles. Such an arrangement can ensure the salient pole ratio not to decrease while increasing an area of a magnetic conduction portion at an outer periphery of the rotor, thereby increasing flux linkage of permanent magnets.

Figure 4:
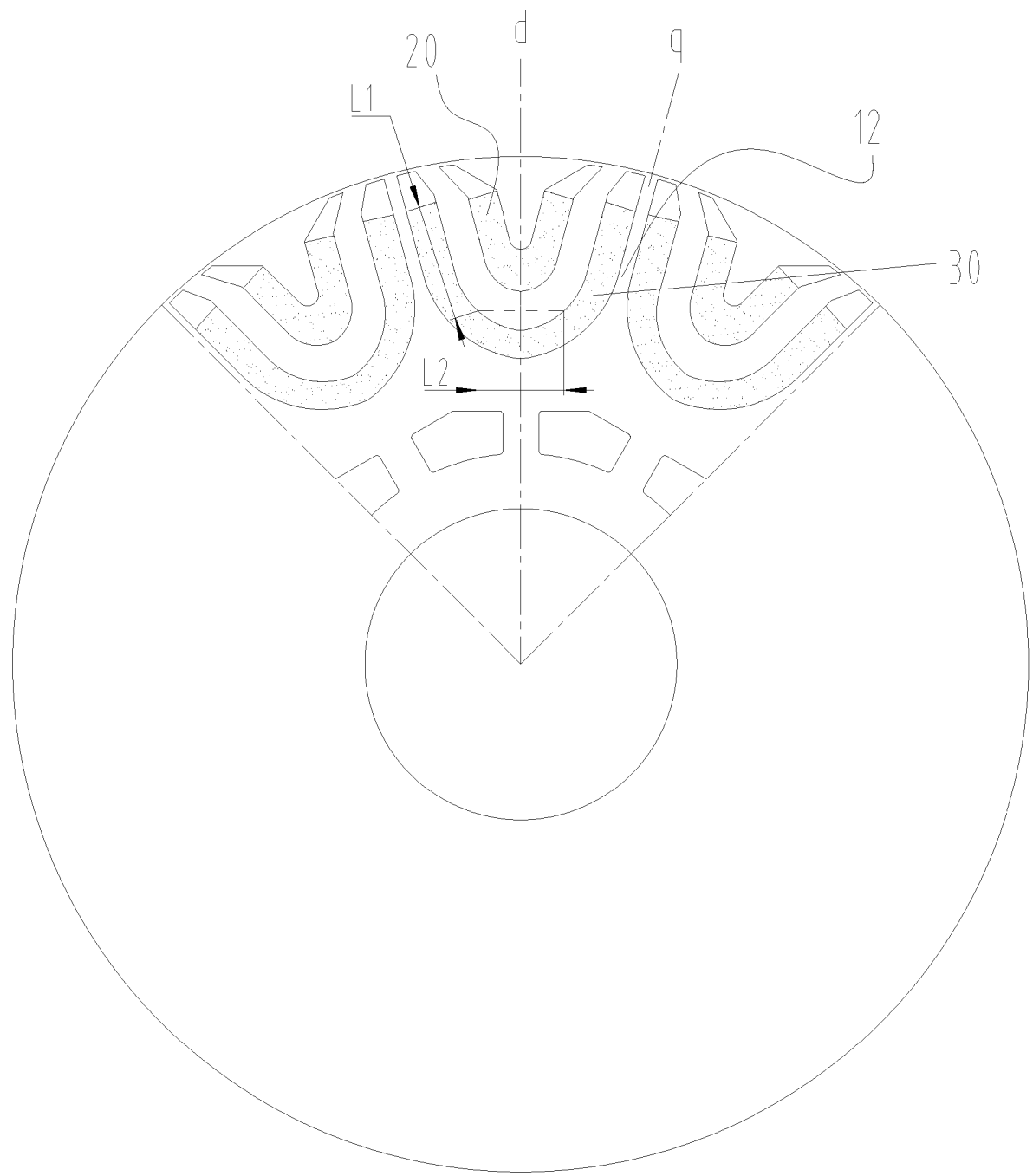
FIG. 4 is a schematic structure diagram illustrating a rotor structure according to a fourth embodiment of the present application.

As shown in FIG. 4, the inner layer magnetic steel slot 12 includes a first inner layer magnetic steel slot segment 121, a second inner layer magnetic steel slot segment 122, and a third inner layer magnetic steel slot segment 123, which are arranged sequentially. The first inner layer magnetic steel slot segment 121, the second inner layer magnetic steel slot segment 122, and the third inner layer magnetic steel slot segment 123 are in communication with one another sequentially to form a U-shaped structure having an opening towards the outer edge of the rotor body 10.

As shown in FIG. 1, the rotor structure further includes an inner layer magnetic steel 30. The inner layer magnetic steel 30 includes a first magnetic steel 31, a second magnetic steel 32, and a third magnetic steel 33. The first magnetic steel 31 is disposed in the first inner layer magnetic steel slot segment 121. The second magnetic steel 32 is disposed in the second inner layer magnetic steel slot segment 122. The third magnetic steel 33 is disposed in the third inner layer magnetic steel slot segment 123. L1 is a length of the first magnetic steel 31 and/or a length of the third magnetic steel 33, and L2 is a length of a connection line between two side walls of two ends of the second magnetic steel 32 towards the outer edge of the rotor body 10, where L2/L1>0.7. Such an arrangement can ensure the better utilization of the permanent magnet namely the magnetic steel, thereby preventing the U-shaped structure from being excessively concave. A bottom of the U-shaped structure can be a straight segment or a curved segment.

Figure 2:
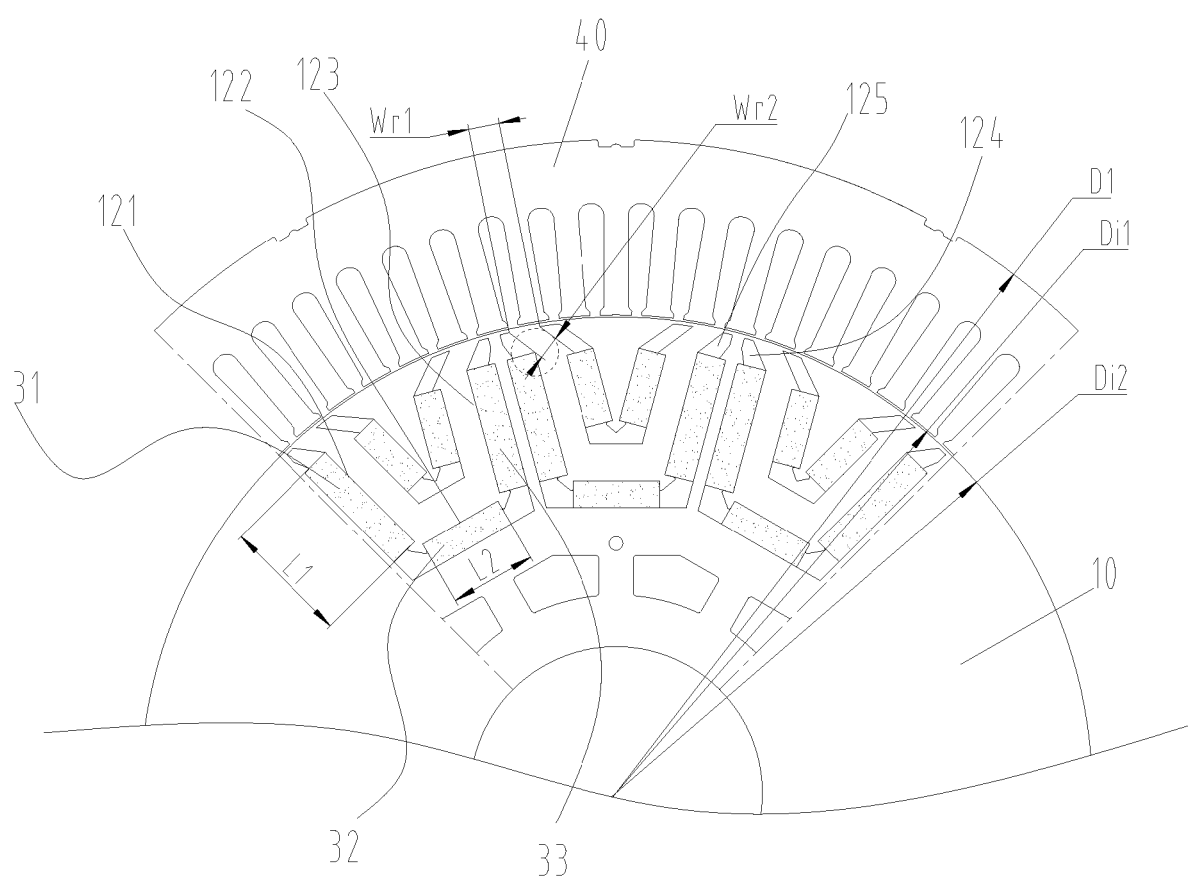
FIG. 2 is a schematic structure diagram illustrating a rotor structure according to a second embodiment of the present application.

As shown in FIGS. 1 and 2, the first magnetic steel 31, the second magnetic steel 32, and the third magnetic steel 33 are spaced apart from one another, and the second magnetic steel 32 is a plate-shaped magnetic steel. As shown in FIG. 4, the first magnetic steel 31, the second magnetic steel 32, and the third magnetic steel 33 are provided as an integral whole, and the second magnetic steel 32 is a U-shaped magnetic steel.

The rotor structures of the above embodiments can also be applied in the technical field of motor equipment. That is, according to another aspect of the present application, a motor is provided. The motor includes a rotor structure, and the rotor structure is any one of the above-mentioned rotor structures.

The rotor structures of the above embodiments can also be applied in the technical field of vehicles. That is, according to another aspect of the present application, an electric vehicle is provided. The electric vehicle includes a rotor structure, and the rotor structure is any one of the above-mentioned rotor structures.

In an embodiment, the outer layer magnetic steel slot and the inner layer magnetic steel slot are respectively provided with the first bent slot and the second bent slot, which are respectively in communication with the outer layer magnetic steel slot and the inner layer magnetic steel slot, and the first bent slot and the second bent slot are arranged to gradually spread away from the direct axis of the flux slot group outwards and in a radial direction of the rotor body. Such an arrangement effectively increases a magnetic conduction distance between the first bent slot and the second bent slot, thereby improving the performance of the rotor body and the efficiency of the motor having the rotor structure.

Referring to FIGS. 1 and 2, the motor further includes a stator 40. An inner circumferential surface of the stator 40 is provided with stator teeth 41. The rotor body 10 is disposed inside the stator and is rotatable relative to the stator 40. An inner diameter of the stator 40 is Di1, and an outer diameter of the rotor body 10 is Di2, where 0.6<Di2/Di1<0.8. D1 is an outer diameter of the stator. Such an arrangement can effectively improve the resistance to the saturation of the motor, thereby effectively increasing the power of the motor and decreasing the costs of manufacturing the motor. Of course, preferably, a value of Di2/Di1 is from 0.68 to 0.75.

As shown in FIG. 1, closed magnetic induction lines are formed between the rotor body 10 and the stator 40. S1 denotes a length of the magnetic induction line formed in the stator 40, and S2 denotes a length of the magnetic induction line formed in the magnetic conduction path of the rotor body 10, where 1.1S1<S2<1.3S1. Such an arrangement can effectively avoid a decrease of the power factor caused by the excessively concave rotor in a case that the motor is heavily loaded.

Specifically, the rotor body is disposed rotatably inside the stator by means of the rotation shaft hole, and there is an air gap between the stator and the rotor. The rotor has a plurality of poles, each of which has a magnetic steel slot group. The magnetic steel slot group includes a plurality of magnetic steel slots. The plurality of magnetic steel slots are arranged in a radial direction. The magnetic steel slot is a hollow air slot, and penetrates in an axial direction of an iron core. The magnetic steel is arranged in a corresponding magnetic steel slot. After the rotor is assembled, portions of the magnetic steel slots, which are proximate to the outer periphery of the rotor, are not fully filled and form the bent slots at ends of the magnetic steel slots. The flux barrier having a thin-wall structure are disposed between the bent slots and the air gap, thus having effects of structurally connecting punching sheets of the rotor as a whole, preventing the magnetic circuit passing through the flux barrier by means of magnetic saturation of the thin-wall structure, and realizing magnetic isolation.

The increase of the outer diameter of the rotor of the motor can make the total length of the air gap increase, that is, the peripheral area of the rotor increases, thereby making the value of the flux linkage increase. Moreover, a width of the magnetic conduction path between two magnetic steels can also increase, which facilitates the increase of the torque. However, the decrease of the stator area may also result in increase of the resistance of the stator. Through a research, it was found that, as for a permanent magnet reluctance motor applied in a new energy vehicle, the increase of the outer diameter Di2 of the rotor facilitates an anti-saturation design, thereby improving the power factor when the motor is heavily loaded. Preferably, when 0.68<Di2/Di1<0.8, the effect of resistance to the saturation of the magnetic circuit are better when the motor is heavily loaded.

Of course, the increase of the outer diameter makes the amount of magnetic steel increase, and makes the amount of cooper decrease. Taking account of costs, if 0.6<Di2/Di1<0.75 is satisfied, an advantage of preferable costs can be achieved. When the outer diameter is too small, a proportion of the costs of the required cooper amount is high, and when the outer diameter increases, the required cooper amount decreases significantly, thereby decreasing the costs. When the outer diameter is too large, the effect of further decreasing the cooper amount is not improved remarkably due to the constant dimension of end portions of windings, while the required amount of magnetic steel increases in direct proportion to the outer diameter, thus increasing the costs.

When the motor is heavily loaded, the decrease of the power factor is substantially caused by the saturation of the magnetic circuit. The design space available for the volume of the magnetic conduction path is small due to the limitation of the structure of the reluctance motor, which is the main reason for the saturation of the magnetic circuit. Regarding this problem combining with the distribution of the magnetic induction lines, the design of the magnetic conduction path between the end portions of the two magnetic steel slots has following features: the minimum distance Wr1 between the second end of the first bent slot 113 and the second end of the third bent slot 124 and the minimum distance Wr2 between the first end of the third bent slot 124 and a side wall of the first bent slot 113 satisfy following relationship: Wr2/Wr1>0.8, where Wr1 denotes a width of a main path through which the rotor receives the stator magnetic induction lines from the stator. When the magnetic conduction path further spreads towards the rotation shaft hole 13, under the influence of the magnetic field, a magnetic field at the inner portion of the magnetic conduction path is much smaller than a magnetic field at a portion of the magnetic conduction path, which is adjacent to the end portions of the magnetic steel slots. As the end portions of the magnetic steel slots are arranged to spread outwards, Wr1>Wr2 is always satisfied. If the end portions of the magnetic steel slots spread outward too much, then Wr2/Wr1 is too small. Thus, the saturation of the magnetic circuit of the portion can reach 3T or more. The torque constant decreases, and the power factor also decreases rapidly.

The design of concavity of the rotor can make the amount of inner layer arm magnetic steel permanent magnets increase, thereby increasing the flux linkage of permanent magnets, and improving the power factor. However, with a further increase of concave degree of the concavity, two following problems will occur: 1. a volume of an inner layer bottom magnetic steel is reduced; 2. the magnetic conduction path of the rotor is lengthened while magnetic potential consumption in the rotor increase, and moreover, an increase of a portion of the rotor conducting magnetic flux will result in the increase of iron losses. Thus, continuing increasing the magnetic steels is useless. Through a research, it was found that the constraints of the following two conditions can make the depth of the concavity to be reasonably controlled. When the length L1 of the inner layer arm magnetic steel and the length L2 of the inner layer bottom magnetic steel satisfy the following relationship L2/L1>0.7, the mount of permanent magnets can be ensured to be better. Moreover, the magnetic induction lines in the rotor should be prevented from being too long, thereby causing unnecessary magnetic potential consumption in the rotor, which will increase when the motor is heavily loaded. When the length S1 of the magnetic induction line passing through the stator and the length S2 of the magnetic induction line passing through the rotor satisfy the following relationship: 1.1S1<S2<1.3S1, the decrease of the power factor, which is caused by the too deep concavity in the rotor when the motor is heavily loaded, can be avoided, wherein the length S2 corresponds to a magnetic induction line passing through a middle portion of the magnetic conduction path between two layers of magnetic steels of each pole, and the length S1 corresponds to a magnetic induction line passing through a middle portion of a tooth corresponding to the end portion of the magnetic conduction path and a middle portion of a rim. The increase of the permanent magnet torque component also has effects on improvement of the power factor. In order to increase the permanent magnet torque component, the magnetic conduction area in the d-axial direction is increased, and a sum of the lengths of the flux barriers at the end portions of the magnetic steel slots is limited to be within a certain range, thus the salient pole ratio can be ensured not to decrease significantly, while the area of the magnetic conduction portion at the outer periphery of the rotor is increased, thereby increasing the flux linkage of permanent magnets. An outer layer magnetic steel 20 is disposed in the outer layer magnetic steel slot. The end portion of the inner layer magnetic steel slot is further provided with a fourth bent slot 125. The fourth bent slot 125 is arranged to be opposite to the third bent slot 124 arranged in the same magnetic steel slot group.

When the rotor is an integral U-shaped structure, a tangential horizontal line is drawn at the middle portion of the intermediate magnetic conduction path dividing the U-shaped structure into arms and a bottom. In the case, the length L2 of the bottom magnetic steel and the length L1 of the arm magnetic steels are illustrated in FIG. 4.

In addition to the above description, it should be noted that "an embodiment", "another embodiment", "embodiment", and the like, which are mentioned in the application, indicate that a specific feature, structure or character described combining with the embodiments is included in at least one embodiment that is generally described in the present application. The same expression appearing in multiple places in the specification is not intended to have to refer to the same embodiment. Further, when a specific feature, structure, or character is described combining with any one of the embodiments, a claim claiming a combination of such feature, structure, or character with other embodiments also falls within the scope of the present application.

In the above embodiments, the description of each embodiment has its own emphasis. A part that is not described in detail in an embodiment can refer to the related description in other embodiments.

What described above are merely preferred embodiments of the present application, but are not intended to limit the present application. For those skilled in the art, the present application may have various modifications and changes. Any modification, equivalent replacement, or improvement made within the spirit and principle of the present application shall fall in the protection scope of the present application.

What is claimed is:

1. A rotor structure, comprising a rotor body provided with permanent magnet slot groups, wherein the permanent magnet slot groups each comprises:

an outer layer permanent magnet slot;

an inner layer permanent magnet slot, wherein the outer layer permanent magnet slot and the inner layer permanent magnet slot are arranged to be adjacent to each other, and a magnetic conduction path is formed between the outer layer permanent magnet slot and the inner layer permanent magnet slot;

the outer layer permanent magnet slot comprises: a first slot bent relative to the outer layer permanent magnet slot, wherein a first end of the first slot is in communication with the outer layer permanent magnet slot, and a second end of the first slot extends towards an outer edge of the rotor body and spreads gradually away from a direct axis;

a third slot bent relative to the inner layer permanent magnet slot, wherein, a first end of the third slot is in communication with the inner layer permanent magnet slot; the third slot is arranged to be adjacent to the first slot, wherein the third slot is defined by a first side and a second side, the first side being parallel to the first slot and a portion of the second side arranged such that the portion is non-parallel with the first side; and a second end of the third slot extends towards the outer edge of the rotor body and spreads gradually away from the direct axis;

a first outer layer permanent magnet slot segment, wherein, a first end of the first outer layer permanent magnet slot segment extends towards a rotation shaft hole of the rotor body; a second end of the first outer layer permanent magnet slot segment extends towards the outer edge of the rotor body and spreads gradually away from the direct axis; the first slot is in communication with the second end of the first outer layer permanent magnet slot segment; and a first flux barrier is formed between the second end of the first slot and the outer edge of the rotor body; and a second outer layer permanent magnet slot segment, wherein, a first end of the second outer layer permanent magnet slot segment extends towards the rotation shaft hole; a second end of the second outer layer permanent magnet slot segment extends towards the outer edge of the rotor body and spreads gradually away from the direct axis; the first outer layer permanent magnet slot segment and the second outer layer permanent magnet slot segment are arranged symmetrically relative to the direct axis; and a second flux barrier is formed between the second end of the third slot and the outer edge of the rotor body;

the permanent magnet slot groups each further comprises a second slot, wherein a first end of the second slot is in communication with the second end of the second outer layer permanent magnet slot segment; the second end of the second slot extends towards the outer edge of the rotor body and spreads gradually away from the direct axis; an angle is formed by a length directional geometric center line of the first slot, and a length directional geometric center line of the second slot; and the first slot and the second slot are arranged symmetrically relative to the direct axis;

A1 denotes a central angle corresponding to an arc of a connection line between a point, at which an extension line of a side wall of the first slot proximate to the direct axis and the outer edge of the rotor body intersect, and a point, at which an extension line of a side wall second slot proximate to the direct axis and the outer edge of the rotor body intersect, and A1>0.63×360°/p, wherein p denotes a number of poles.

2. The rotor structure of claim 1, wherein Wr1 denotes a minimum distance between the second end of the first slot and the second end of the third slot, and Wr2 denotes a minimum distance between the first end of the third slot and a side wall of the first slot, wherein Wr2/Wr1>0.8.

3. The rotor structure of claim 2, wherein the outer layer permanent magnet slot comprises:

a first outer layer permanent magnet slot segment, wherein, a first end of the first outer layer permanent magnet slot segment extends towards a rotation shaft hole of the rotor body; a second end of the first outer layer permanent magnet slot segment extends towards the outer edge of the rotor body and spreads gradually away from the direct axis; the first slot is in communication with the second end of the first outer layer permanent magnet slot segment; and a first flux barrier is formed between the second end of the first slot and the outer edge of the rotor body; and a second outer layer permanent magnet slot segment, wherein, a first end of the second outer layer permanent magnet slot segment extends towards the rotation shaft hole; a second end of the second outer layer permanent magnet slot segment extends towards the outer edge of the rotor body and spreads gradually away from the direct axis; the first outer layer permanent magnet slot segment and the second outer layer permanent magnet slot segment are arranged symmetrically relative to the direct axis; and a second flux barrier is formed between the second end of the third slot and the outer edge of the rotor body.

4. The rotor structure of claim 2, wherein the inner layer permanent magnet slot comprises a first inner layer permanent magnet slot segment, a second inner layer permanent magnet slot segment, and a third inner layer permanent magnet slot segment, which are arranged sequentially; the first inner layer permanent magnet slot segment, the second inner layer permanent magnet slot segment, and the third inner layer permanent magnet slot segment are in communication with one another sequentially to form a U-shaped structure having an opening towards the outer edge of the rotor body.

5. The rotor structure of claim 1, wherein A3 denotes a central angle corresponding to an arc of the first flux barrier, and A2 denotes a central angle corresponding to an arc of the second flux barrier, wherein 0.18×360°/p>A2+A3>0.13×360°/p, and p denotes a number of poles.

6. The rotor structure of claim 1, wherein the inner layer permanent magnet slot comprises a first inner layer permanent magnet slot segment, a second inner layer permanent magnet slot segment, and a third inner layer permanent magnet slot segment, which are arranged sequentially; the first inner layer permanent magnet slot segment, the second inner layer permanent magnet slot segment, and the third inner layer permanent magnet slot segment are in communication with one another sequentially to form a U-shaped structure having an opening towards the outer edge of the rotor body.

7. The rotor structure of claim 6, wherein the rotor structure further comprises an inner layer permanent magnet, and the inner layer permanent magnet comprises:

a first permanent magnet disposed in the first inner layer permanent magnet slot segment;

a second permanent magnet disposed in the second inner layer permanent magnet slot segment; and a third permanent magnet disposed in the third inner layer permanent magnet slot segment, wherein L1 is a length of the first permanent magnet and a length of the third permanent magnet, and L2 is a length of a connection line of two side walls of two ends of the second permanent magnet towards the outer edge of the rotor body, wherein L2/L1>0.7.

8. The rotor structure of claim 7, wherein the first permanent magnet, the second permanent magnet, and the third permanent magnet are spaced apart from one another; the second permanent magnet is a plate-shaped permanent magnet; or the first permanent magnet, the second permanent magnet, and the third permanent magnet are provided as an integral whole, and the second permanent magnet is a U-shaped permanent magnet.

9. The rotor structure of claim 6, wherein the rotor structure further comprises an inner layer permanent magnet, and the inner layer permanent magnet comprises:

a first permanent magnet disposed in the first inner layer permanent magnet slot segment;

a second permanent magnet disposed in the second inner layer permanent magnet slot segment; and a third permanent magnet disposed in the third inner layer permanent magnet slot segment, wherein L1 is a length of the first permanent magnet or a length of the third permanent magnet, and L2 is a length of a connection line of two side walls of two ends of the second permanent magnet towards the outer edge of the rotor body, wherein L2/L1>0.7.

10. A permanent magnet auxiliary synchronous reluctance motor, comprising the rotor structure of claim 1.

11. The permanent magnet auxiliary synchronous reluctance motor of claim 10, further comprising a stator, wherein, an inner circumferential surface of the stator is provided with stator teeth; the rotor body is disposed inside the stator and is rotatable relative to the stator; an inner diameter of the stator is Di1; an outer diameter of the rotor body is Di2, wherein 0.6<Di2/Di1<0.8.

12. The permanent magnet auxiliary synchronous reluctance motor of claim 11, wherein closed magnetic induction lines are formed between the rotor body and the stator; S1 denotes a length of a magnetic induction line formed in the stator, and S2 denotes a length of a magnetic induction line formed in the magnetic conduction path of the rotor body, wherein 1.1S1<S2<1.3S1.

13. The permanent magnet auxiliary synchronous reluctance motor of claim 11, wherein 0.68<Di2/Di1<0.75.

14. The permanent magnet auxiliary synchronous reluctance motor of claim 11, wherein 0.68<Di2/Di1<0.8.

15. The permanent magnet auxiliary synchronous reluctance motor of claim 10, wherein Wr1 denotes a minimum distance between the second end of the first slot and the second end of the third slot, and Wr2 denotes a minimum distance between the first end of the third slot and a side wall of the first slot, wherein Wr2/Wr1>0.8.

16. The permanent magnet auxiliary synchronous reluctance motor of claim 10, wherein the outer layer permanent magnet slot comprises:

a first outer layer permanent magnet slot segment, wherein, a first end of the first outer layer permanent magnet slot segment extends towards a rotation shaft hole of the rotor body; a second end of the first outer layer permanent magnet slot segment extends towards the outer edge of the rotor body and spreads gradually away from the direct axis; the first slot is in communication with the second end of the first outer layer permanent magnet slot segment; and a first flux barrier is formed between the second end of the first slot and the outer edge of the rotor body; and a second outer layer permanent magnet slot segment, wherein, a first end of the second outer layer permanent magnet slot segment extends towards the rotation shaft hole; a second end of the second outer layer permanent magnet slot segment extends towards the outer edge of the rotor body and spreads gradually away from the direct axis; the first outer layer permanent magnet slot segment and the second outer layer permanent magnet slot segment are arranged symmetrically relative to the direct axis; and a second flux barrier is formed between the second end of the third slot and the outer edge of the rotor body.

17. An electric vehicle, comprising the rotor structure of claim 1.

* * * * *